Nov. 28, 1961 — D. W. LAVIANA ET AL — 3,011,034
LINEAR SCALE TIMER
Filed March 20, 1957

INVENTORS
DONALD W. LAVIANA
EDWARD D. BARTON
BY
THEIR ATTORNEY

Nov. 28, 1961     D. W. LAVIANA ET AL     3,011,034
LINEAR SCALE TIMER Filed March 20, 1957     6 Sheets-Sheet 2

INVENTORS
DONALD W. LAVIANA
EDWARD D. BARTON
BY
*M. H. Strickland*
THEIR ATTORNEY

INVENTORS
DONALD W. LAVIANA
EDWARD D. BARTON
BY
M. H. Strickland
THEIR ATTORNEY

INVENTORS
DONALD W. LAVIANA
EDWARD D. BARTON
BY
THEIR ATTORNEY

3,011,034
LINEAR SCALE TIMER
Donald W. Laviana, Pittsford, and Edward D. Barton, Rochester, N.Y., assignors to General Motors Corporation, Detroit, Mich., a corporation of Delaware
Filed Mar. 20, 1957, Ser. No. 647,377
20 Claims. (Cl. 200—38)

This invention pertains to timers, and particularly a linear scale timer for performing a plurality of actuating movements in timed sequence, the time intervals between actuating movements being selective over a desired range.

While the linear scale timer of the present invention is particularly useful for performing a plurality of switching operations at selected time intervals, it can be used for performing operations other than actuating a switch. Moreover, while the linear scale timer is described herein as a range timer, the concepts set forth and the principles of operation are applicable to other apparatus which is dependent upon its operation on a timing schedule. Thus, while the disclosed apparatus comprises a range timer, it is to be understood that this is only exemplary since the invention is not limted to such use.

Heretofore, in range timers the scales indicating the hours to cook, or cooking period, and the stop cooking hour, or finish time, have not been completely visible to the operator. In other words, while it has been proposed heretofore to separate the stop cooking indicating means and the hours to cook indicating means from the clock face, the operator was unable to see the entire range of possible settings. In addition, the timer of the present invention is so designed that it is impossible to set a cooking interval of more hours than remain at the setting operation between the time of setting and the finish time, or stop cooking hour. Furthermore, in the timer of the present invention, the motor train for driving the clock and the switch controlling mechanism during a cooking cycle, is completely disengaged from the switch controlling mechanism when the timer is placed in the manual position or is driven to the off position, thereby minimizing the load normally imposed upon the clock motor and assuring maximum life thereof. Accordingly, among our objects are the provision of a timer including a plurality of independent setting means; the further provision of a timer having linear scales; the further provision of a linear scale timer incorporating a novel cable differential facilitating independent adjustment of a pair of indicating means; the further provision of a range timer including means for preventing the setting of more hours to cook than remain between the time of setting and the stop cooking hour; and the still further provision of a motor driven timer assembly including means interrupting the driving connection between the motor and the timer mechanism when it is in the manual and off positions.

The aforementioned and other objects are accomplished in the present invention by incorporating a cable differential in the timer assembly. Specifically, the timer assembly includes a convention clock drive train which is driven by a synchronous motor. The timer assembly includes a front plate and a back plate spaced therefrom, the synchronous motor and the range switch being mounted on the back plate. A stop cooking pulley assembly and an hours to cook pulley assembly are mounted coaxially of the hour tube and minute shaft of the clock train. The stop cooking pulley assembly includes a flange one-half the diameter of the stop cooking pulley, the stop cooking pulley and the hours to cook pulley being of the same diameter. The pulley assemblies are interconnected by a pair of cables. A stop cooking cable has one end attached to a stop cooking indicator, is trained about the stop cooking pulley flange, is attached to the stop cooking pulley and has the other end connected through a tension spring to the stop cooking indicator. An hours to cook cable has one end attached to the hours to cook pulley through a tension spring, is trained thereabout, is trained about a first idler pulley, a differential pulley, a second idler pulley and is trained about and connected to the stop cooking pulley. The hours to cook cable is also trained about a third idler pulley, a second differential pulley associated with a stop cooking indicator, is trained about a fourth idler pulley and the hours to cook pulley, and has its other end attached to the hours to cook pulley.

The front plate of the timer assembly includes a clock dial, a linear stop cooking scale and a linear hours to cook scale having off and manual positions. An hours to cook setting knob, a stop cooking setting knob and a clock adjustment knob are mounted on the front plate. The stop cooking setting knob is connected to a double pinion and clutch assembly for rotating the stop cooking pulley assembly and the hours to cook pulley assembly relative to a time arm attached to the hour tube. The hours to cook knob is connected to a pinion gear for rotating the hours to cook pulley assembly relative to the stop cooking pulley assembly, rotation of the stop cooking pulley assembly being prevented at this time by a gear lock.

The rear side of the hours to cook pulley assembly has pivotally attached thereto a switch lever and a time lever. The time lever can also move radially relative to the hours to cook pulley. In addition, a switch bridge is slidably mounted on the hour tube. The switch bridge is biased by means of a spring towards the front plate and includes lugs arranged to project through aligned slots in the hours to cook pulley assembly and the stop cooking pulley assembly when the timer is moved to the off position.

The switch bridge is attached to a sleeve upon which a spool is slidably mounted. The spool is engaged by a switch actuator, the switch actuator being connected to a leaf spring switch normally biased to the closed position. The lugs, or tongues, of the switch bridge can be cammed out of the slots in the stop cooking pulley so as to move the switch bridge towards the back plate and permit the leaf spring switch to close. This occurs whenever the hours to cook pulley is angularly displaced relative to the stop cooking pulley in either direction from the "off" position. The leaf spring switch will be permitted to close when the timer is moved to the manual position but will be prevented from closing when the timer is in the set position since the switch lever mounted on the hours to cook pulley assembly has a latch engageable with the switch spool to prevent movement of the switch actuator so as to close the switch.

To set the timer for automatic cooking operation, either the hours to cook knob or stop cooking knob may be manipulated first. Preferably the stop cooking knob is manipulated first, so that rotation will be imparted to both the stop cooking pulley and the hours to cook pulley. The angular displacement between the stop cooking pulley and the time arm driven by the clock gear train is indicated on the stop cooking linear scale. During manipulations of the stop cooking setting means, movement is not imparted to the hours to cook indicator due to the cable differential since the length of cable wound or unwound from the stop cooking pulley assembly is, respectively, unwound or wound on the hours to cook pulley assembly. However, when the hours to cook setting means is manipulated, the stop cooking pulley is restrained against rotation and in this manner the hours to cook indicator is actuated. The angular displacement between the hours to cook pulley and the stop cooking pulley is always shown by the hours to cook indicator irrespective of the angular displacement of both pulleys relative to the clock driven time arm.

During the setting operation, the switch lever on the hours to cook pulley which has the latch, engages the switch spool so as to prevent closure of the switch even though the switch bridge has been moved towards the back plate. When the time arm arrives at the position indicating the time when the cooking operation should commence, it engages the time lever on the hours to cook pulley which in turn removes the latch end of the switch lever from the spool. As soon as the stop cooking pulley is driven by engagement of the time arm with the time lever, the reaction force between the switch bridge and the switch lever will release the latch and permit the range switch to close starting the cooking cycle. During continued movement of the time arm during the cooking cycle, the hours to cook pulley assembly will be rotated relative to the stop cooking pulley assembly towards the "off" position, and the indicator likewise will be so driven. When the hours to cook pulley assembly is moved to its initial angular position relative to the stop cooking pulley assembly, i.e. the "off" position, the notches in these pulley assemblies will be aligned so as to permit movement of the switch bridge towards the front plate thereby opening the range switch. Moreover, movement of the hours to cook pulley assembly into alignment with the stop cooking pulley assembly automatically interrupts the driving connection between the time arm and the time lever on the hours to cook pulley thereby stopping rotation of the hours to cook pulley and the hours to cook indicator. At this time, the motor driven clock train will only drive the clock hands to minimize the load thereon.

Further objects and advantages of the present invention will be apparent from the following description, reference being had to the accompanying drawings wherein a preferred embodiment of the present invention is clearly shown.

Figure 1:
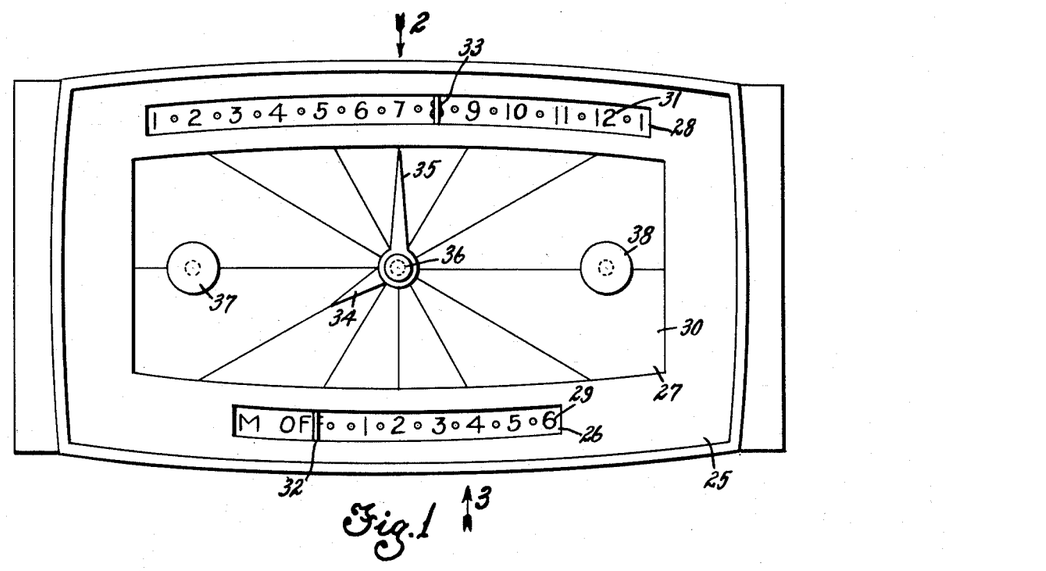
FIGURE 1 is a front view in elevation of the range timer assembly constructed according to this invention.

With particular reference to FIGURE 1, the range timer of the present invention includes a cover plate designated by the numeral 25 having openings 26, 27 and 28 behind which are located an hours to cook scale 29, a clock dial 30 and a stop cooking scale 31, respectively. The scales 29 and 31 and the clock dial are printed on a front plate 24. It is specifically pointed out that the hours to cook scale and the stop cooking scale are separated from the face of the clock dial, and the hours to cook scale includes a lineal movable indicator 32, while the stop cooking scale includes a lineally movable indicator 33. In a conventional manner the clock includes an hour hand 34 and a minute hand 35 as well as a setting knob 36. The linear range timer includes independent setting means comprising a stop cooking setting knob 37 and an hours to cook setting knob 38. The stop cooking setting knob, when actuated, adjusts the position of the indicator 33 so as to indicate the stop cooking hour. The hours to cook setting knob 38, when actuated, moves the indicator 32 to select the desired length of cooking period. The indicator 32 is also movable to a manual position in which the conventional range switch and thermostat can be set to heat an oven manually. While the scale 31 has been designated the stop cooking scale, it is to be understood that it can be also termed the finish time of the cooking cycle. Similarly, the hours to cook scale can be designated the cooking period.

Figure 2:
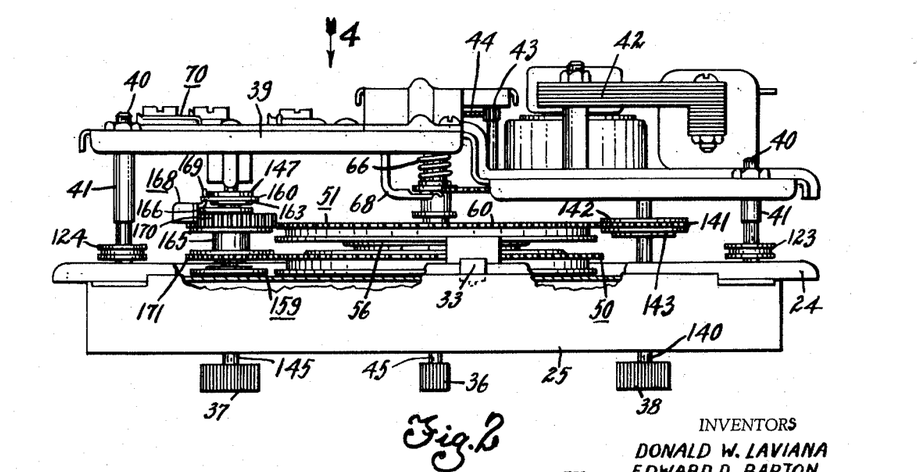
FIGURE 2 is a top view with certain parts broken away and the cables removed, taken in the direction of arrow 2 of FIGURE 1.
Figure 7:
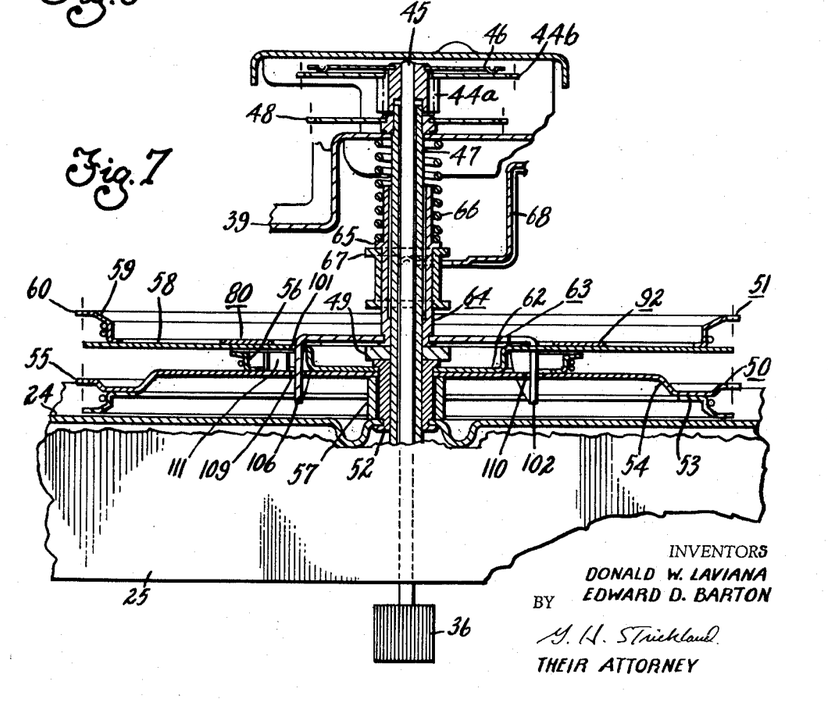
FIGURE 7 is an enlarged fragmentary sectional view taken along line 7—7 of FIGURE 6.

With particular reference to FIGURE 2, the front plate 24 is connected to a rear plate 39 by a plurality of bolts 40 which support the pulleys, to be described, and have tubular spacers 41 arranged coaxially thereon to maintain the front and back plates in spaced relationship. A synchronous electric motor 42 of conventional design is mounted on the back plate 39, the motor being connected through a conventional clock gear train to the clock hands. As aforementioned, the gear train of the clock is conventional and thus includes a pinion gear 43 that meshes with a gear 44. The gear 44 is connected by gears, not shown, to gear 44b which, as seen in FIGURE 7 is connected to a pinion 44a attached to a shaft 45 through a conventional friction type spring clutch 46. The minute hand 35 is connected to the shaft 45 as is the time setting knob 36. An hour tube 47 is mounted coaxially of the minute shaft 45 and has attached thereto a gear 48 which is driven at $\frac{1}{12}$ revolution per hour from a pinion 44a by a conventional reduction gear train, not shown. The hour hand 34 is attached to the tube 47. A timer arm 49 is attached to the hour tube 47 so as to rotate therewith at the rate of $\frac{1}{12}$ revolution per hour.

Figure 3:
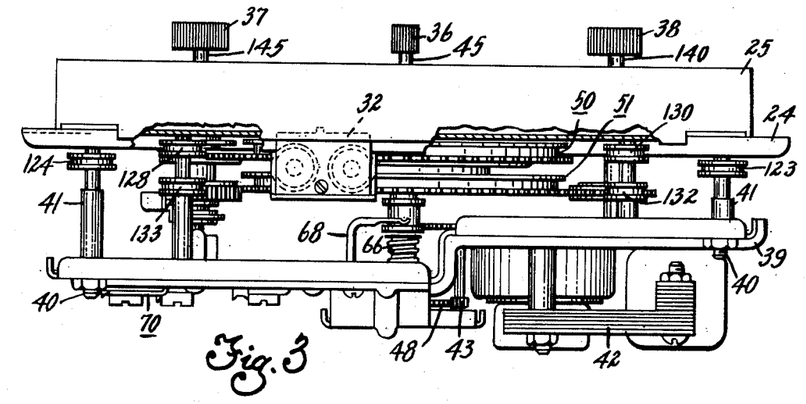
FIGURE 3 is a bottom view with certain parts broken away and the cables removed, taken in the direction of arrow 3 of FIGURE 1.

As seen in FIGURES 2, 3 and 7, the range timer includes a stop cooking pulley assembly 50 and an hours to cook pulley assembly 51 coaxial with the minute shaft 45 and the hour tube 47. The stop cooking pulley assembly 50 is rotatably mounted on a sleeve 52 attached to the front plate and within which the hour tube 47 is rotatably journalled. The pulley assembly 50 includes a flange 53 and a plate 54, the plate 54 having a toothed periphery 55. In addition, a flange 56 is attached to the plate 54, the flange 56 being one-half the diameter of the pulley assembly 50. The plate 54 is maintained in spaced relation from the front plate 24 by a collar 57 spaced radially from the sleeve 52.

The hours to cook assembly 51 includes a plate 58 and a flange 59, the flange 59 having a toothed periphery 60. The plate 58 has a depressed central portion 62. In addition, the plate 58 of the hours to cook pulley assembly 51 and the plate 54 have openings, to be described later, which permit a switch bridge 63 to move axially towards the front plate 24 to the position shown in FIGURE 7 when the mechanism is in the "off" position.

Figures 4, 5:
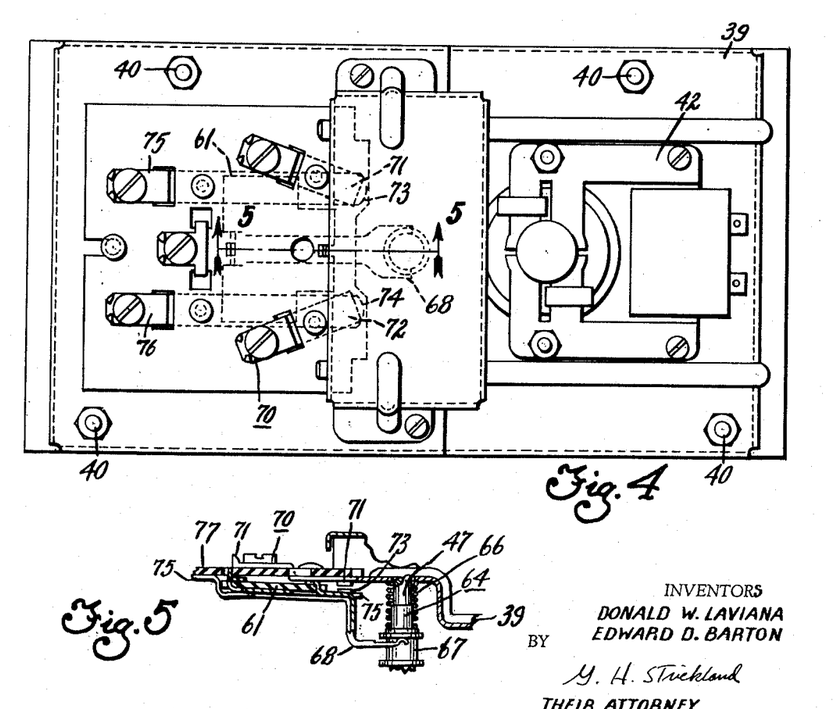
FIGURE 4 is a back view of the range timer assembly taken in the direction of arrow 4 of FIGURE 2.
FIGURE 5 is a fragmentary sectional view taken along line 5—5 of FIGURE 4.

The bridge 63 is attached to a sleeve 64 slidably mounted on the hour tube 47, the sleeve 64 having a shoulder 65 against which seats one end of a compression spring 66. The other end of the compression spring 66 engages the back plate 39. The spring 66 biases the sleeve 64 and the bridge 63 towards the front plate 24 at all times. The sleeve 64 has slidably mounted thereon a control spool 67, which is engaged by a yoke 68 constituting a switch actuator. As seen in FIGURES 4 and 5, the rear plate 39 has attached thereto a switch assembly 70. The switch assembly 70 constitutes no part of this invention, and thus may be of any conventional type including a pair of stationary contacts 71 and 72 which are engageable by movable contacts 73 and 74 respectively. The movable contacts 73 and 74, are respectively, attached to leaf springs 75 and 76 which are biased so as to normally close the switch. The actuator 68 is attached to an insulating member 61 which engages the leaf springs 75 and 76. The actuator is also pivotally mounted on an insulating member 77. When the spring 66 is compressed by movement of the bridge 63 towards the rear plate 39, the spool 67 and actuator 68 are free to move relative to the sleeve 64 under the urge of the leaf springs 75 and 76 so as to move the movable contacts into engagement with the stationary contacts to close the switch. In accordance with conventional practice, the switch 70 is in series with a conventional thermostatic and manually operable switch of a range and thus, must be closed at all times to heat the oven.

Figure 6:
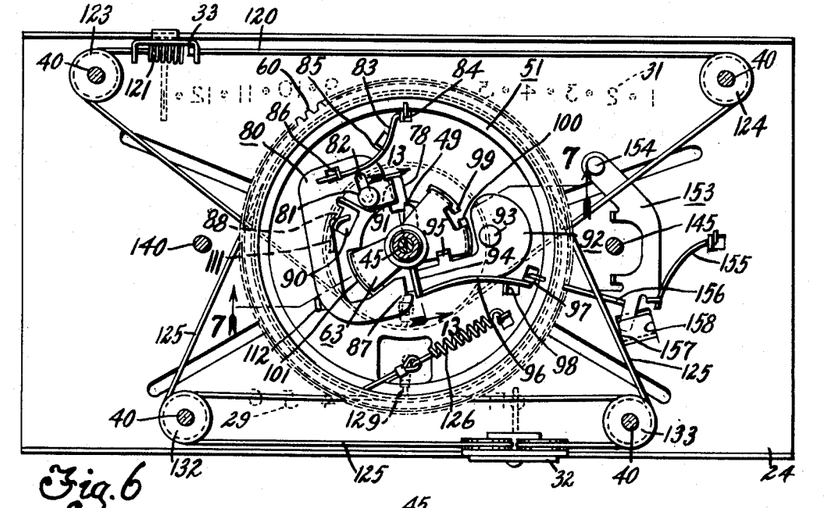
FIGURE 6 is a rear view of the front plate of the range timer of the present invention, partly in section and partly in elevation with certain parts removed, showing the switch mechanism in the "off" position.

With particular reference to FIGURES 6 and 7, a time lever 80 is mounted on the plate 58 by means of a pin 81. The pin extends through an elongated slot 82 in the time lever 80 so as to permit both pivotal and substantially radial movement of the time lever 80 relative to the plate 58. The time lever 80 is biased towards the hour tube 47 by a hairpin spring 83, one end of which is attached to a lug 84 fastened on the plate 58, the intermediate portion of which engages an upstruck lug 85 on the plate 58, and the other end of which is attached to a lug 86 on the time lever 80. The time lever 80 is substantially U-shaped and includes a latch end 87, a cam follower portion 88 which extends through an opening 90 in the plate 58 and a drive end flange 91, which extends through a slot 78 in the plate 58.

Figures 8, 9, 10, 11, 12, 13:
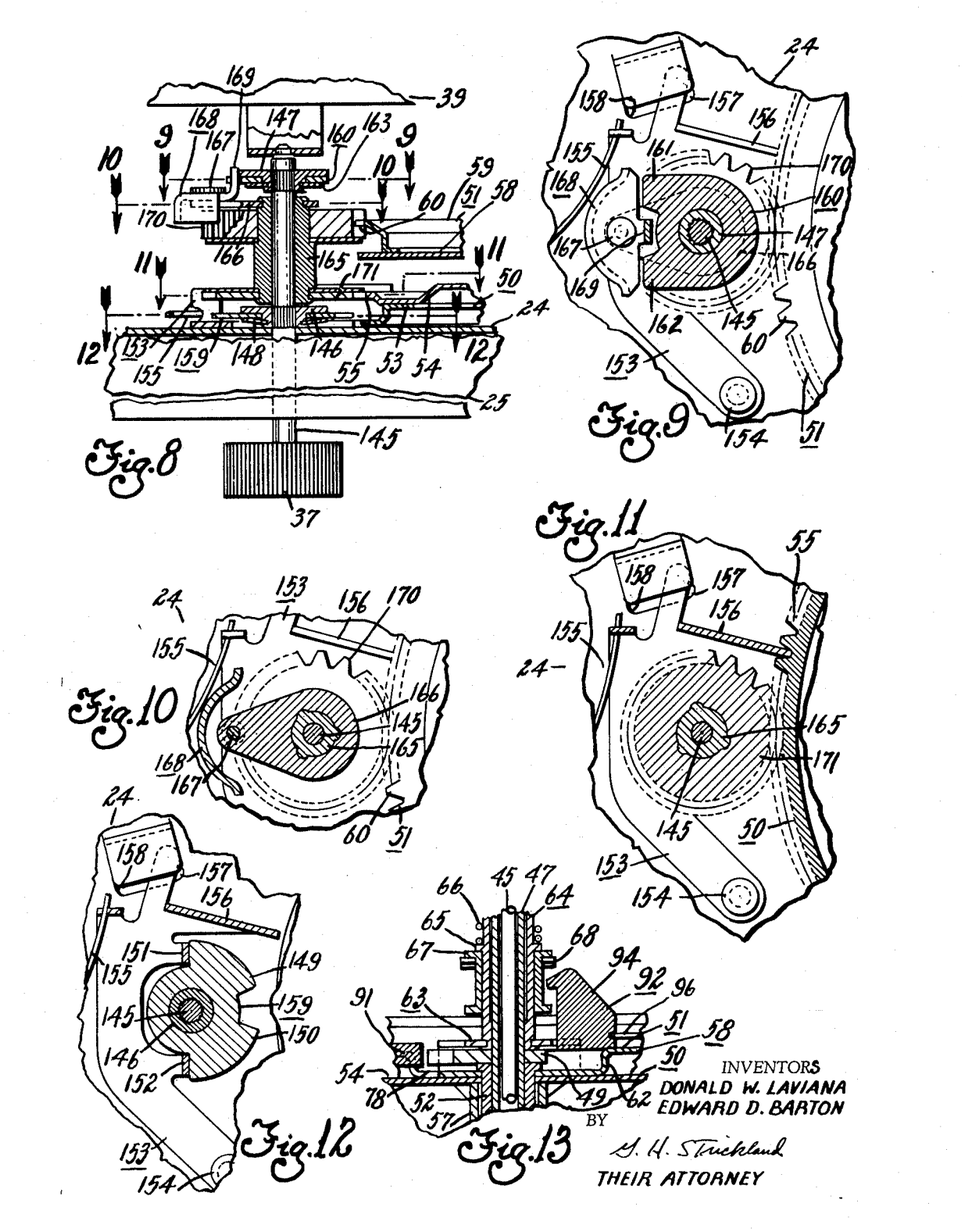
FIGURE 8 is a fragmentary sectional view of the setting means for the stop cooking pulley.
FIGURES 9, 10, 11 and 12 are respectively fragmentary views, partly in section and partly in elevation, taken along lines 9—9, 10—10, 11—11 and 12—12 of FIGURE 8.
FIGURE 13 is a sectional view taken along line 13—13 of FIGURE 6.

A switch lever 92 is pivotally mounted on the plate 58 by means of a pin 93. The switch latch lever 92, as shown in FIGURE 13 includes a hooked flange 94 constituting a latch and arranged to engage the control spool 67 in certain instances and prevent closure of the switch 70. The switch lever 92 also includes an inclined tang 95 which extends rearwardly towards the plate 39 as seen particularly in FIGURE 17. The switch lever 92 is biased toward the center of the hour tube by a hairpin spring 96, one end of which is attached to a lug 97 on the plate 58, the intermediate portion of which engages a lug 98, and the other end of which is secured to the lever 92. In addition, the end of the lever 92 to which the hairpin spring 96 is engaged, is adapted to receive the latch end 87 of the time lever 80 as will be pointed out more particularly hereinafter. (See FIG. 20.)

Figure 17:
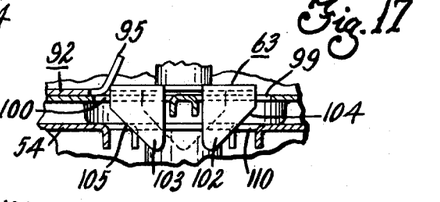
FIGURES 17 and 18 are respectively fragmentary sectional views taken along lines 17—17 and 18—18 of FIGURE 15.
Figures 18, 19:
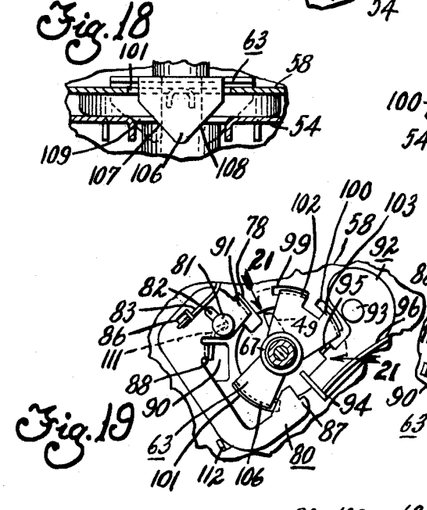
FIGURE 19 is a fragmentary view in elevation of the relative positions of the parts in the "manual" position.

Plate 58 has a pair of apertures 99 and 100 as well as a slot 101 concentric with the hour tube 47. The apertures 99, 100 and the slot 101 receive the ends of the bridge 63. As seen particularly in FIGURES 17 and 18, one end of the bridge 63 has formed thereon a pair of depending lugs 102 and 103 having inclined surfaces 104 and 105 respectively. The other end of the bridge 63 has a single depending lug 106 having opposed inclined surfaces 107 and 108. The plate 54 of the stop cooking pulley assembly has a pair of slots 109 and 110 therein which receive the lugs 102, 103 and 106 of the bridge 63 when the pulley assemblies 50 and 51 are angularly aligned, as occurs only in the "off" position. (FIGS. 17 and 18.) The slots in the plate 58 are of greater arcuate extent than the lugs on the bridge 63 and thus plate 58 is angularly movable a small distance relative to the bridge. The plate 54 also has formed thereon an upstanding cam surface 111 which cooperates with the cam follower 88 of the time lever 80. More particularly, when the pulley assemblies 50 and 51 are aligned as in the "off" position, the follower 88 engages cam 111 as shown in FIGURE 6 and positions the time lever 80 in a radially outward position where the time arm 49 will not engage the flange 91. Moreover, the lever 80 will be moved to a position wherein it will abut a stop lug 112 on the plate 58.

Figure 14:
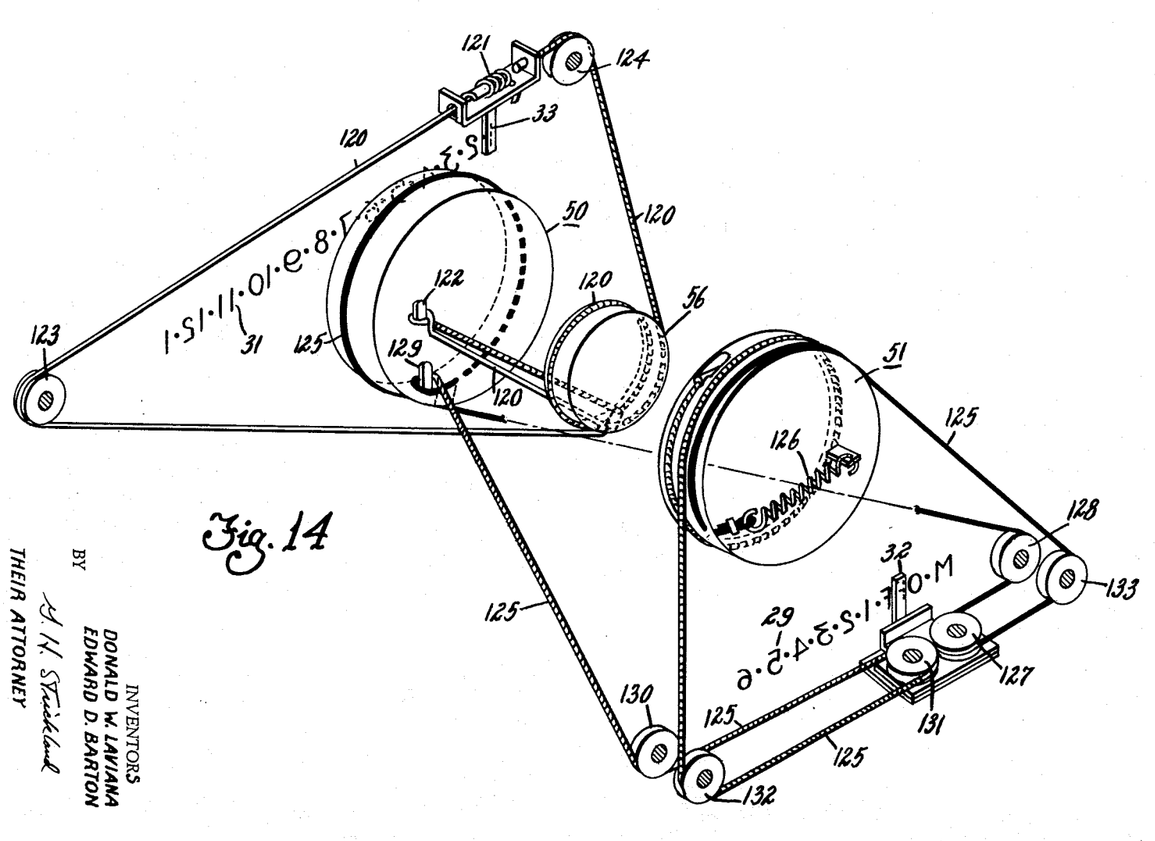
FIGURE 14 is a schematic view of the manner in which the cables are attached to the pulley assemblies and indicators.
Figure 15:
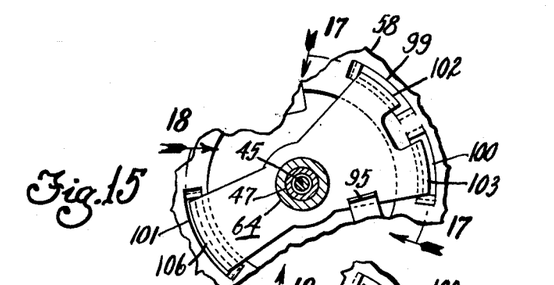
FIGURE 15 is a fragmentary view in elevation of the switch bridge and hours to cook pulley assembly in the "off" position.
Figure 16:
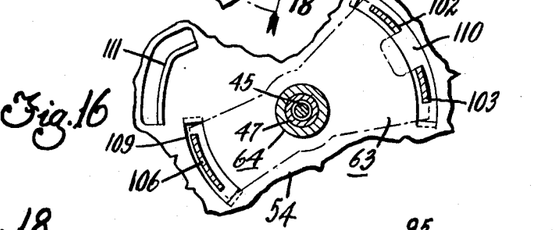
FIGURE 16 is a fragmentary view of the stop cooking pulley assembly in the "off" position with portions of the bridge shown in phantom lines.

With particular reference to FIGURE 14, the manner in which the pulley assemblies 50 and 51 are interconnected by cables will next be described. The word "cable" as used in the application is intended to include any strong flexible tension member of limited elasticity, the various forms of which include a cord, a filament, a string, a thread, twine and wire. A stop cooking cable 120 has one end attached to a spring 121, the other end of which is attached to the indicator 33. The spring 121 maintains the requisite tension in the stop cooking cable 120. The stop cooking cable 120 is trained about an idler pulley 123 and passes through a hole in the flange 56 and is wrapped about a lug 122 of the stop cooking pulley 50. Thereafter, it passes through a second hole in the flange 56 and is wrapped thereabout. The other end of the cable 120 is trained about an idler pulley 124 and is attached to the indicator 33. The pulley flange 56 which is one-half the diameter of the pulley 50 is merely used to limit the travel of the indicator 33 so that the extent of the scale 31 can be maintained within the width of the front plate 24.

An hours to cook pulley cable 125 has one end attached to a tension spring 126, the other end of which is attached to the hours to cook pulley assembly 51. The cable 125 is trained about the pulley 51 and is also trained about an idler pulley 133, a differential pulley 127 secured to the differential pulley block bracket of the indicator 32, trained about a second idler pulley 128 and is trained about the stop cooking pulley 50. The cable 125 is attached to the pulley 50 by passing around a lug 129, and thence is trained about a third idler pulley 130 and then about a second differential pulley 131 attached to the differential pulley block bracket of the indicator 32. From the differential pulley 131 the cable is trained about an idler pulley 132 after which it is trained about the hours to cook pulley 51 and has its other end secured thereto.

As seen in FIGURE 2, the hours to cook setting knob 38 is attached to a shaft 140 which is journalled in the front and back plates 25 and 39 respectively. The shaft 140 has attached thereto a drive pinion 141 by means of a spring washer 142. The clutch drive spring 142 urges the pinion gear 141 into frictional engagement with a disc 143 attached to the shaft 140. The arrangement of the pinion gear 141 on the shaft 140 is such that the clutch drive effected by spring 142 can be overcome if it is overloaded. The pinion gear 141 meshes with the teeth 60 formed on the flange 59 of the hours to cook pulley assembly 51.

The stop cooking setting knob 37 is attached to a shaft 145. With particular reference to FIGURE 8, it can be seen that the shaft 145 has attached thereto a pair of axially spaced hubs 146 and 147. The hub 146 has a lock release member 159 supported thereon and urged into frictional engagement therewith by a spring 148. As seen in FIGURE 12, the lock release element 159 includes a pair of abutments 149 and 150 arranged to engage lugs 151 and 152 respectively on a locking lever 153 pivoted by means of pins 154 to the front plate 24. Pivotal movement of lever 153 is limited by stops 157 and 158 on the front plate 24. The lever 153 is urged towards the stop cooking gear teeth 55 by a hairpin spring 155. The locking lever 153 includes a pawl portion 156 arranged to engage the slots between the teeth 55 on the stop cook flange 54. The pawl 156 of the lock lever 153 normally prevents rotation of the stop cook pulley assembly 50 except when the knob 37 is rotated in either direction. Thus, when the knob 37 and the shaft 145 is rotated in either direction, the hub 146 imparts movement to the release member 159 so as to effect pivotal movement of the locking lever 153 and move the pawl 156 out of engagement with the gear teeth 55 on the stop cook pulley assembly.

The hub 147 supports a disc 160 having a pair of lugs 161 and 162 as seen in FIGURE 9. The disc 160 is urged into frictional engagement with the hub 147 by a spring 163. A sleeve 165 is journalled on the shaft 145 and has attached thereto a crank arm 166. As seen particularly in FIGURES 8 and 10, the crank arm 166 has a pin 167 interconnecting the crank arm with a drive pawl 168. The drive pawl 168 constituting a clutch, has a tang 169 disposed in the notch between lugs 161 and 162 of the disc 160. Either end of the drive pawl 168 is engageable with the teeth of a pinion 170 journalled on the hub 165. A pinion gear 171 is staked to the hub 165 as seen in FIGURE 11. When the shaft 145 is rotated by actuating the knob 37, the disc 160 pivots the pawl 168 so as to move one end or the other into driving engagement with the pinion 170. Thereupon due to rotation of the shaft 145, the pawl 168 will drive pinion 170 and the crank arm 166 to rotate the hub 165 and the gear 171. Since pinion gear 170 meshes with the gear teeth 60 on the hours to cook pulley assembly 51, and since pinion 171 meshes with the gear teeth 55 on the stop cooking pulley assembly, which has been freed for rotation by removal of pawl portion 156 of the locking lever 153, both pulley assemblies will be rotated.

The stop cooking indicator 33 always shows the angular position of the pulley assemblies 50 and 51 in relation to the time arm 49. The angular displacement between the hours to cook pulley assembly 51 and the stop cooking pulley assembly 50 is shown by the hours to cook indicator 32. When the pulley assemblies 50 and 51 are angularly aligned, the indicator 32 is in the "off" position as depicted in FIGURE 1. When the stop cooking setting knob 37 is rotated in either direction, the hours to cook pulley assembly 51 and the stop cooking pulley assembly 50 are rotated in the same direction and thus there is no relative angular displacement therebetween. When the knob 37 is rotated in the clockwise direction as viewed in FIGURE 1, the indicator 33 is moved to the right as viewed in FIGURE 1. With reference to FIGURE 14 it can be seen that when the stop cooking pulley 50 and the hours to cook pulley 51 are rotated in the counterclockwise direction, left hand end of cable 120 will be wound about the pulley flange 56 thereby pulling the indicator 33 to the left as viewed in FIGURE 14. At the same time the amount of cable wound on pulley 56 is unwound by the other side thereof so as to permit movement of the indicator 33. At this time the hours to cook indicator 32 remains stationary. This action is due to the differential cable assembly since the length of cable 125 wound or unwound from the stop cooking pulley assembly 50 is respectively unwound or wound on the hours to cook pulley assembly 51. Thus, if the pulleys 50 and 51 are rotated in the counterclockwise direction as viewed in FIGURE 14, the right hand end of the cable 125 will be wound about pulley 51, while the left hand end will be unwound therefrom. Similarly, the left hand end of the cable 125 on pulley 50 will be unwound while the right hand end will be wound thereon. Thus, during simultaneous rotation of the pulleys 50 and 51, no movement will be imparted to the indicator 32, since cable 125 wound about the stop cooking pulley assembly 51 from the differential pulley 127 will be supplied from the stop cooking pulley 50. Similarly, the cable 125 wound onto the stop cooking pulley assembly 50 from the differential pulley 131 will be supplied from the hours to cook pulley assembly 51.

However, the indicator 32 will be moved when the hours to cook pulley assembly 51 is rotated relative to the stop cooking pulley assembly 50 by rotating the setting knob 38 in the clockwise direction as viewed in FIGURE 1. It will be recalled that during the rotation of the knob 38, the stop cooking pulley 50 is locked against rotation by the pawl 156 of the locking lever 153 which engages the gear teeth 55, and the clutch pawl 168 permits rotation of pinion 170 relative to the hub 165.

The arrangement of the hours to cook cable 125 provides a cable differential which allows independent setting of the hours to cook and the stop cooking indicators, the hours to cook indicator always showing the angular displacement between the hours to cook pulley and the stop cooking pulley. As aforementioned, when the hours to cook pulley and the stop cooking pulley are angularly aligned so that the depending lugs 102, 103 and 106 of the switch bridge are aligned with openings 99, 100, and slot 101 in the plate 58 as well as slots 109 and 110 of the plate 54, the range timer will be in the "off" position. In the "off" position, which is indicated in FIGURES 6 and 13, the switch bridge 63 is urged towards the front plate 25 by the spring 66. In moving towards the front plate, the bridge 63 moves the sleeve 64, and the shoulder 65 on the sleeve 64 engages the spool 67 so as to positively move the actuator 68 and open the range timer switch 70. Moreover, in the "off" position, the time arm 49 does not engage the flange 91 on the time lever 80 attached to the hours to cook pulley assembly and therefore the load on the motor 42 is only that required to drive the clock hands.

Figure 21:
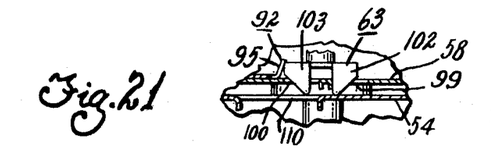
FIGURE 21 is a fragmentary sectional view taken along line 21—21 of FIGURE 19.

When the hours to cook setting knob 38 is moved in the counterclockwise direction so as to move the indicator 32 to the manual position, as viewed in FIGURE 1, the hours to cook pulley assembly 51 is rotated in the counterclockwise direction relative to the stop cooking pulley assembly 50 as viewed in FIGURE 6 to the position shown in FIGURE 19. When the hours to cook pulley assembly 51 is moved to this position it can be seen that the cam follower 88 is moved relative to the cam 111 and engages a portion thereof. Moreover, this relative angular movement between the hours to cook pulley and the stop cooking pulley assembly effects movement of the switch bridge 63 towards the back plate 39 since the lugs 102 and 106 on the bridge 63 engage the ends of the slots 110 and 109 in the plate 54 and, thus the bridge 63 is moved to the position shown in FIGURE 21. This movement of the bridge 63 towards the back plate causes the bridge 63 to engage the inclined tab 95 on the switch lever 92 so as to pivot the switch lever in a counterclockwise direction as viewed in FIGURE 6 whereby the projecting hooked latch end 94 on the switch latch lever will be disengaged from the spool 67. Accordingly, the switch 70 will be closed due to the resiliency of the leaf springs 75 and 76.

When the hours to cook setting knob 38 is moved to the "off" position, the hours to cook pulley assembly 51 is rotated in the clockwise direction as viewed in FIGURE 6 so as to align the slots 99 and 100 with the slot 110 and the slot 101 with the slot 109. Accordingly, the bridge 63 will move towards the front plate under the urge of spring 66 to the position shown in FIGURE 7. This forward movement of the bridge 63 will move the spool 67 so as to open the range switch 70. Moreover, the latch end 94 of the lever 92 will engage the spool 67 and prevent switch closure.

Figure 20:
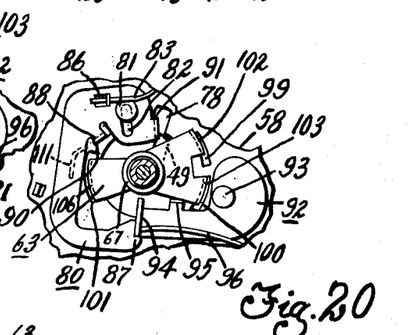
FIGURE 20 is a view similar to the FIGURE 19 showing the parts in the "set" position.

The switch 70 opens since the spring 66 is stronger than the leaf springs 75 and 76 which tend to close the switch 70. When the hours to cook indicator is set, the hours to cook pulley assembly 51 is rotated in the clockwise direction relative to the stop cooking pulley assembly 50 as viewed in FIGURE 6. The arrangement of parts just prior to overtaking time is shown in FIGURE 20 from which it can be seen that the cam follower 88 is disengaged from the cam 111 whereby the spring 83 moves the time lever 80 towards the axis of the hour tube 47. At the same time, the latch end 87 engages the switch lever 92 so as to prevent outward radial movement thereof. During the clockwise movement of the hours to cook pulley assembly 51 relative to the stop cooking pulley assembly 50, the bridge 63 is moved towards the rear plate 39 since the depending lugs thereon are cammed out of the plate 54. However, the switch 70 cannot close since the hooked latch end 94 of the switch lever 92 engages the spool 67.

Assuming less hours to cook are set than actually remain between the present time and the stop cooking hour, the flange 91 of the time lever 80 will not engage the time arm 49. Therefore, as time progresses the time arm 49 will engage the flange 91 of time lever 80 which is attached to the hours to cook pulley assembly, constituting the driven member, and pivot the time lever 80 in a clockwise direction as viewed in FIGURE 20. This movement will disengage the latch end 87 from the switch lever 92. However, the switch will not be permitted to close since the spring 96 maintains the latch or hooked end 94 engaged with the spool 67. However, as soon as the hours to cook pulley assembly 51 is driven by the time arm 49 through the time lever 80, throughout an arcuate distance equivalent to five minutes, the reaction between the bridge 63 and the upstruck tang 95 will be such as to force the switch lever 92 to pivot in the counterclockwise direction about pin 93 thereby releasing the spool 67 so that the switch 70 can close. If the operator attempts to set the cooking period of more hours than actually remain between the present time and the stop cooking hour, the time lever 80 will move into engagement with the time arm 49 so as to prevent an erroneous setting. The switch 70 will not close immediately but, as soon as the hours to cook pulley assembly 51 is rotated by the time arm 49, the reaction forces between the bridge 63 which has a slight lost motion connection with the plate 58, and the switch lever 92 will be such as to disengage the hooked end 94 from the spool 67 to permit closure of the switch 70. Normally the time interval required to close the switch 70 when overtaking time is approximately five minutes.

To operate the range timer of the present invention, the stop cooking setting knob 37 is first manipulated to select the finish cooking time. By rotating the knob 37 in either direction, the indicator 33 moves lineally and both the stop cooking pulley and the hours to cook pulley assemblies are rotated throughout the same angle. During operation of the stop cooking knob 37 no movement is imparted to the hours to cook indicator 32, and thus it will remain in the manual position. Next, the operator actuates the hours to cook setting knob 38 and moves the indicator 32 from the "manual" through the "off" to the desired number of cooking hours as indicated on the scale 29. With the manual thermostatic switch of the oven set for the desired temperature, when the algebraic sum of clock time and the hours indicated on the scale 29 equals the stop cooking hour, the cooking cycle will commence, since the time arm 49, or driving element, will engage the time lever 80 on the hours to cook pulley assembly. Shortly thereafter, the hours to cook pulley will begin rotating in the clockwise direction with the time arm 49 and the switch 70 will close. As time progresses, the indicator 32 will be driven back towards the "off" position, and, at the end of the cooking cycle the indicator will be in the "off" position and the switch 70 will be open.

From the foregoing it is manifest that the present invention provides a range timer wherein the entire range of settings are visible at all times. In addition, the utilization of linear scales greatly facilitates the ease of establishing a cooking cycle since the scales are separate from the clock dial and cannot be confused therewith. In addition, the load imposed upon the clock motor 42 is reduced to a minimum since it has no driving connection with the switching apparatus except during an actual cooking cycle. The term "linear scale" as used in the claims designates a scale which extends similarly to a line in contrast to a circular scale which is symmetrical about a center point.

While the embodiment of the present invention as set forth herein constitutes a preferred form, it is to be understood that other forms might be adopted.

What is claimed is as follows:

1. A linear scale timer including, a pair of linear scales, a pair of lineally movable indicators, a pair of setting means, a pair of control elements, a cable differential arrangement interconnecting both of said control elements and one of said indicators, a cable connecting the other indicator and one of said control elements, and driving connections between said setting means and said control elements for moving both of said control elements simultaneously to displace said other indicator, and for effecting relative movement between said control elements to displace said one indicator.

2. In a timer, a pair of setting means, a pair of linear scale indicators, a pair of coaxial control elements, a driving element, a cable differential arrangement connecting both control elements with one of said indicators, a driving connection between one of said setting means and one of said control elements for rotating said one control element relative to the other control element, the relative rotation between said control elements being shown by said one indicator, a cable interconnecting said other control element and said other indicator, a driving connection between said other setting means and both of said control elements for rotating said control elements relative to said driving element, the angular displacement of said control elements relative to said driving element being shown by said other indicator, and means establishing a driving connection between said one control element and said driving element in predetermined relative angular positions of said control elements.

3. In a timer, a pair of setting means, a pair of linear scale indicators, a pair of coaxial control elements, a rotatable driving element, a cable differential arrangement interconnecting both of said control elements and one of said indicators, a driving connection between one of said setting means and one of said control elements for rotating said one control element relative to the other control element, the angular displacement between said elements being shown by said one indicator, means restraining rotation of said other control element during rotation of said one control element, a cable interconnecting the other control element and the other indicator, a driving connection between said other setting means and both of said control elements for rotating said control elements relative to said driving element, the angular displacement of said control element relative to said driving element being shown by said other indicator, and means establishing a driving connection between said one control element and said driving element in predetermined relative angular positions of said control elements.

4. In a timer, two setting means, two coaxial control elements, a driving element, a switch control member carried by one of said control elements and movable axially relative thereto, cam means between said member and the other control element whereby relative movement between said control elements will displace said member axially, a driving connection between one of said setting means and said one control element for displacing said one control element relative to the other control element, a driving connection between the other setting means and both of said control elements for displacing both of said control elements relative to said driving element, and means establishing rotating driving connection between said driving element and said one control element at predetermined relative positions of said control elements for rotating said one control element relative to the other control element.

5. In a timer, first and second coaxial pulley assemblies, a first and second setting means, a linear scale indicator, a cable differential pulley block having two pulleys thereon connected to said indicator, a first cable fastened to and wound about the first pulley assembly in a first direction extending from a first direction about a first pulley of said pulley block and thence in the opposite direction to the second pulley assembly and being wound about in a first direction and fastened to said second pulley assembly, a second cable fastened to and wound about the first pulley assembly in a second direction extending from a second direction about a second pulley of said pulley block and thence in the opposite direction to the second pulley assembly and being wound about in a second direction and being fastened to the second pulley assembly, a driving connection between said first setting means and said first pulley assembly for rotating said first pulley assembly relative to the second pulley assembly, the displacement between said pulley assemblies being shown by said indicator, a driving connection between the second setting means and both pulley assemblies for rotating said pulley assemblies, a driving element, means restraining rotation of said second pulley assembly during rotation of said first pulley assembly by said first setting means, and means establishing a driving connection between said first pulley assembly and said driving element at predetermined relative angular positions of said pulley assemblies.

6. The timer set forth in claim 5 wherein said pulley assemblies have toothed peripheries, and wherein the driving connection between said first setting means and said first pulley assembly comprises a pinion engaging the toothed periphery of said first pulley assembly.

7. The timer set forth in claim 5 wherein said pulley assemblies have toothed peripheries, and wherein the driving connection between said second setting means and both pulley assemblies comprise a pinion engaging the toothed peripheries of said first pulley assembly, a pinion engaging the toothed periphery of the second pulley assembly, and a clutch interconnecting said pinions for simultaneous movement during operation of said second setting means while permitting movement of the first pinion relative to the second pinion upon actuation of said first setting means.

8. The timer set forth in claim 7 wherein said second setting means includes a shaft, a hub rotatably journalled on the shaft, said first pinion being rotatably journalled on said hub, said second pinion being attached to said hub, and wherein said clutch comprises a pawl engageable with the first pinion, a crank arm attached to said hub and pivotally supporting said pawl, and a disc having a pair of lugs engageable with said powl for moving said pawl into driving engagement with said first pinion gear during rotation of said shaft.

9. The timer set forth in claim 5 wherein the means establishing a driving connection between said first pulley assembly and said driving element comprises a lever pivotally mounted on said first pulley assembly and adapted for radial movement relative thereto, coengaging cam means on said lever and said second pulley assembly for moving said lever out of the path of movement of said driving element when said pulley assemblies are aligned, and resilient means for moving said lever into the path of movement of said driving element when said pulleys are displaced relative to each other.

10. The timer set forth in claim 5 including, a switch controlling bridge carried by said first pulley assembly and movable axially relative thereto, and coengaging cam means on said bridge and said second pulley assembly for effecting axial movement thereof when said pulley assemblies are displaced relative to each other.

11. In a timer, setting means, a rotatable driving shaft, a time drive arm attached to the shaft, first and second pulley assemblies journalled on the shaft adapted to be set in selected positions by said setting means, said pulley assemblies having aligned openings in a predetermined relative position thereof, a bridging member mounted coaxially of the shaft and having lugs arranged to be received in the alinged openings of said pulley assemblies, a sleeve operably connected to said bridging member, resilient means engaging said sleeve for biasing said bridge towards said pulley assemblies, a spool slidably mounted on the bridge, a first lever mounted on said first pulley assembly for pivotal and radial movement relative thereto, a second lever pivotally mounted on said first pulley assembly and engageable with said spool to prevent movement thereof, coengaging cam means on said first lever and said second pulley assembly for maintaining said first lever out of the path of movement of said time arm when said pulley assemblies are angularly aligned, resilient means engaging said first lever for moving it into the path of movement of said time arm when said pulley assemblies are displaced relative to each other in one direction, a driving connection between said setting means and both pulley assemblies for rotating both pulley assemblies relative to said time arm, and a driving connection between said setting means and said first pulley assembly for rotating said first pulley assembly relative to the other pulley assembly and thereby establishing a driving connection between said time arm and said first lever in a predetermined relative position thereof.

12. Control mechanism including first and second rotatable devices coaxially mounted, an axially movable means movably connected to the first rotatable device and coacting with the second rotatable device to provide relative movement, first manual setting means operably connecting with both said first and second rotatable devices for setting said first and second rotatable devices, second manual setting means for rotating said first rotatable device relative to the second rotatable device, a rotatable driving means, said first rotatable device being provided with engageable means engageable by said driving means to establish a driving relationship for rotation relative to said second rotatable device, a control means operated from one position to another coincidentally to the establishing of said driving relationship, and means responsive to the coaction between said second rotatable device and said axially movable means for operating said control means from said another position to said one position.

13. Control mechanism including a shaft, first and second rotatable devices coaxially mounted relative to said shaft, a third device coaxially mounted relative to said shaft, a drive means rotatable coaxially relative to said shaft, a biased control device operably connected to said third device and biased in one direction to move said third device axially in one direction, said first rotatable device having projecting means extending into the path of said drive means for engagement and rotation therewith, releasable holding means for said third device releasable in response to said engagement for releasing said third device for operation of said control device in said one direction under said bias, and means responsive to a particular relative positioning of said first and second rotatable devices for moving said third device axially to move said control device in the opposite direction against said bias.

14. Control mechanism including first and second rotatable devices coaxially mounted, an axially movable means movably connected to the first rotatable device and coacting with the second rotatable device to provide relative movement, first manual setting and holding means for setting and holding said second rotatable device, second manual setting means for rotating said first rotatable device relative to the second rotatable device, a rotatable driving means, said first rotatable device being provided with engageable means engageable by said driving means to establish a driving relationship for rotation relative to said second rotatable device, and means upon said second rotatable device for engaging and moving said engageable means out of the path of said driving means to prevent a driving relationship with said driving means.

15. Control mechanism including first and second rotatable devices coaxially mounted, a lever pivotally mounted upon said first device, a drive means rotatable upon the axis of said devices, said lever having a first projection for engagement by said drive means, spring means acting upon said lever to move said projection into the path of said drive means, said second device being provided with a cam, said lever having a second projection extending into the path of and engaged by said cam for moving said first projection out of the path of said drive means.

16. Control mechanism including first and second rotatable devices coaxially mounted, an axially movable means movably connected to the first rotatable device and coacting with the second rotatable device to provide relative movement, first manual setting and holding means for setting and holding said second rotatable device, second manual setting means for rotating said first rotatable device relative to the second rotatable device, a rotatable driving means, a lever pivotally mounted upon said first device, a biased control means biased from one position to another, resilient means having sufficient force for overcoming said bias for moving said control means from said another position to said one position and for resiliently holding said control means in said one position, said lever being provided with latch means for preventing the operation of said control means, and means responsive to the attainment of a particular relationship between said drive means and said first device for operating said lever to release said latch means.

17. A substantially linear scale timer including a linear scale, a linear indicator movable along said scale, first and second control means, a differential arrangement having one element operably connected to said first control means and a second element operably connected to said second control means and a third element operably connected to said indicator for moving said indicator along said scale in accordance with the difference in the movement of the first and second control means.

18. A substantially linear scale timer including a linear scale, a linear indicator movable along said scale, first and second control means, a cable differential arrangement including a movable pulley block operably connected to said indicator, said pulley block having two pulleys thereon, said arrangement including a first cable extending in one direction from said first control means to one of said pulleys and in the opposite direction to the second control means and a second cable extending in the opposite direction from said first control means to the second pulley and thence in said one direction to said second control means for moving said indicator along said scale in accordance with the difference in the movement of the first and second control means.

19. In a timer, two coaxial control elements, setting means for simultaneously moving and positioning both of said control elements to any desired selected position, setting means for moving and positioning one of said control elements relative to the other a selected amount, drive means for engaging and driving said one control element in its selected position relative to the other control element, a control device responsive to the engagement between said drive means and said one control element for movement to a first position and responsive to a predetermined relative positioning of one control element relative to the other for movement to a second position, and means responsive to a predetermined positioning of said one control element relative to the other for preventing engagement between said drive means and said one control element and for coincidentally causing movement of said control device from its second position to its first position.

20. In a timer, two coaxial control elements, setting means for simultaneously moving and positioning both of said control elements to any desired selected position, setting means for moving and positioning one of said control elements relative to the other a selected amount, drive means for engaging and driving said one control element in its selected position relative to the other control element, a control device having means responsive to the angular engagement between said drive means and said one control element for causing its movement from one position to another and having means responsive to the movement of said one control element into a predetermined angular relationship with said other control element for causing its return movement from said another position to said one position and including means for coincidentally disengaging said drive means from said one control element.

References Cited in the file of this patent

UNITED STATES PATENTS

| | | |
|---|---|---|
| 1,189,651 | Adsit | July 4, 1916 |
| 2,027,275 | Foster | Jan. 7, 1936 |
| 2,292,458 | Maser | Aug. 11, 1942 |
| 2,458,853 | Hughes | Jan. 11, 1949 |
| 2,491,341 | Tillman | Dec. 13, 1949 |
| 2,538,188 | Brietzke | Jan. 16, 1951 |
| 2,578,965 | Blok | Dec. 18, 1951 |
| 2,733,764 | Bliss | Feb. 7, 1956 |